United States Patent [19]

Lewus

[11] 3,916,274
[45] Oct. 28, 1975

[54] SOLID STATE MOTOR STARTING CONTROL

[76] Inventor: Alexander J. Lewus, 9844 N. 11th Ave., Phoenix, Ariz. 84021

[22] Filed: July 29, 1974

[21] Appl. No.: 492,587

[52] U.S. Cl. .............................. 318/221 E; 318/227
[51] Int. Cl.² .......................................... H02P 1/44
[58] Field of Search ............ 318/221 R, 221 E, 227, 318/229

[56] References Cited
UNITED STATES PATENTS

| | | | |
|---|---|---|---|
| 3,573,579 | 4/1971 | Lewis | 318/221 E |
| 3,792,324 | 2/1974 | Suarez et al. | 318/221 E |

Primary Examiner—G. Z. Rubinson
Attorney, Agent, or Firm—LaValle D. Ptak, Drummond, Nelson & Ptak

[57] ABSTRACT

An improved solid state motor starting switch is disclosed, which switch is adaptable to single-phase induction motors of the split-phase, capacitor-start, or capacitor-start capacitor-run type, the switch circuit utilizing bidirectional semiconductor devices and a running winding current sensitive control device such as a bias resistor, inductor or transformer, for operating the semiconductor device, typically one or more triacs, to ON and OFF states, respectively, during motor starting and motor running conditions. Two rectifier or zener diodes, parallel connected back-to-back, are disposed in series connection in the gate circuit of the semiconductor switch such that the control device develops a control voltage in excess of the diode forward voltage during motor starting. During normal running, the control voltage from the control device falls below the diode forward voltage drop in the PN junction region such that leakage current is very small in order to reduce the triac gate voltage to a correspondingly small value during motor running conditions.

10 Claims, 6 Drawing Figures

SOLID STATE MOTOR STARTING CONTROL

This invention relates to motor starting means and, more particularly, to an improved solid state current sensitive motor starting control employing one or more bidirectional solid state semiconductor devices, such as triacs, which motor starting control is adapted for use with single-phase induction motors of the capacitor-start, capacitor-start/capacitor-run, and split-phase types.

It is difficult to adapt a solid state motor starting switch of the current sensitive type which is both inexpensive and reliable and which can withstand considerable abuse such as encountered with heavy motor starting loads, during frequent starting and reversing, operation at high temperatures, during high voltage surges, at high current harmonics and feedback voltages, etc. It is also necessary that the motor withstand and fully conduct in the motor starting mode and fully disconnect the switch or open the starting winding circuit during normal running conditions.

The triac gate circuit voltage is typically several hundred millivolts in the non-conduction state when the motor starting winding circuit is switched open. It is well known that, in semiconductor devices, including triacs, there is a certain amount of leakage current in the nanoampere range in the non-conduction state. The leakage current through the triac increases if there is a small current flow in the gate circuit. As this leakage current is undesirable, it is useful to reduce the leakage current to a very low value in order to prevent damage to the triac due to high voltage surges resulting from feedback caused by inductive and capacitive reactance of the motor upon starting and during running with frequent reversing.

Further, due to motor impedance characteristics, mainly the motor stator magnetic core B/H curve, iron saturation at motor starting and certain running conditions causes operation at high current levels which are difficult to handle with inexpensive solid state bidirectional devices.

Therefore, the principal object of the present invention is to provide a bias variable impedance means in the gate circuit of a triac to effect voltage drop such that, during motor starting conditions, the bias means presents a low impedance to switch the triac to the ON state, and for reducing the voltage drop across the gate circuit of the triac during normal running conditions when the triac is in the non-conduction state to a minimum which supplies high impedance in the gate circuit of the triac to prevent damage during extreme heavy load operation and/or during frequent reversing.

In another aspect, it is an object of my invention to provide two semiconductor diodes in back-to-back, parallel connection in the gate circuit of a triac for achieving a variable impedance by operating the diodes at forward voltage drop during motor starting conditions and below the forward voltage drop during running conditions, thereby reducing the triac gate voltage to a minimum which reduces the triac leakage current to a few nanoamperes to thus prevent damage to the triac during motor starting and during running under extreme heavy-duty conditions.

Still another object of my invention is to provide a resistor bias means disposed in series with the gate electrode of a triac for reducing the voltage drop across the gate circuit when the triac is in a non-conduction state so as to prevent damage to the triac.

Still another object of my invention is to utilize diode rectifiers, or zener diodes, disposed in back-to-back, parallel connection in the gate circuit of a triac. The diodes operate at forward voltage drop during motor starting conditions and at less than forward voltage drop during motor full load and no load running conditions to effectively completely cut off the triac to establish very low leakage current. This increases the life of the solid state motor starting switch.

It is known that silicon semiconductor rectifier diodes are characterized by a forward voltage drop of about 0.7 volts across the PN junction. It is this forward voltage drop of diodes which is used to effect dephasing and increase the impedance in the gate circuit during the triac off state.

Thus, still another object of my invention is to provide a combination of two silicon diodes parallel connected, back-to-back in series with the gate circuit of a motor starting control triac device. The triac so protected can be operated intermittently at high surge current, overloading the triac 100% or greater beyond its current rating. The diodes are incorporated in the motor starting winding circuit with the triac such that motor starting and heavy-load running conditions are achieved without damage to the bidirectional triac.

Yet another object of this invention is to provide two diodes back-to-back parallel connected in series in the gate circuit of a triac, and also employing a resistor connected across the triac anodes to achieve further suppression of any transient feedback surge current, the dv/dt network, for preventing damage to the triac upon starting the motor under a heavy load.

Still another object of my invention is to utilize a resistor and zener diodes, series connected, and disposed across the triac anodes for further suppressing any feedback voltage/current surges to prevent damage to the triac upon motor starting and running at extremely heavy load applications and during quick reversing or "instant" reversing.

The manner in which these and other objects of the invention are achieved may be better understood from the following specification, taken in conjunction with the subjoined claims and the drawings, of which:

Figure 5:
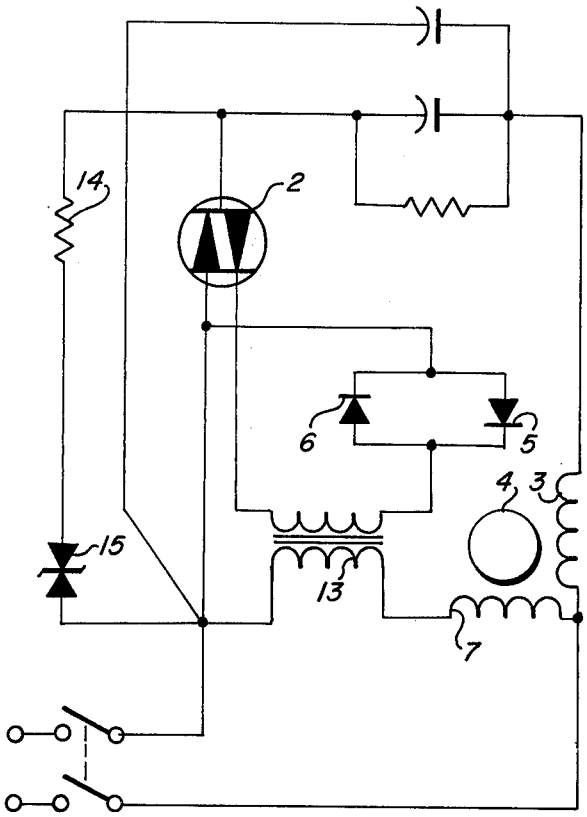
Figure 6:
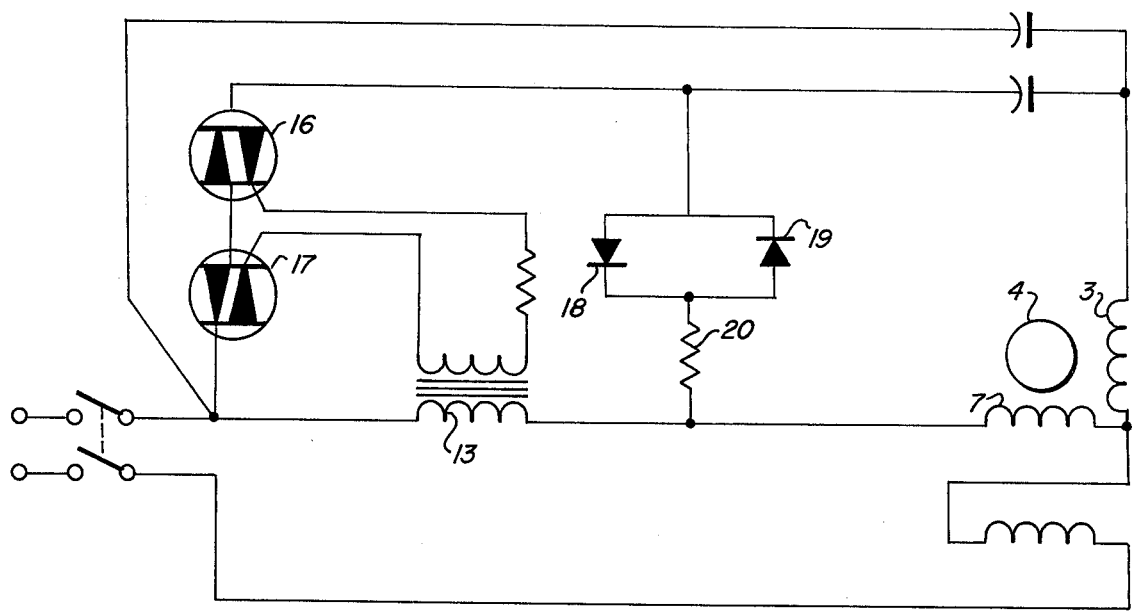
Figure 3:
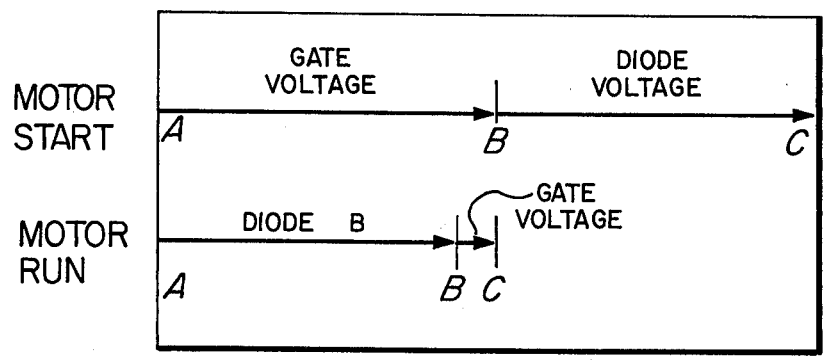
FIG. 3 is a vector diagram illustrating aspects of the operation of motors according to my invention.

FIG. 5 is a schematic diagram of a capacitor-start, capacitor-run motor circuit using a transformer having primary and secondary current control for the triac, the current transformer primary being connected in series with the running winding, and the secondary winding being connected in series in the triac gate circuit with two rectifier diodes in parallel, back-to-back connection and a resistor connected in series with two zener diodes across the triac anodes; and FIG. 6 is a schematic diagram of another embodiment of my invention wherein two triacs, are series connected in the start winding circuit. A transformer secondary winding and a resistor are connected in series in the gate circuits of a triacs to develop a resistor developed bias for the gate. In addition a resistor and two rectifier diodes are connected in a series circuit across the external triacs anodes to suppress transient voltages.

A fundamental feature of my invention is the use of two diodes in back-to-back, parallel connection and in series in the gate circuit of a triac for operating the combination as a solid state motor starting switch. Additionally, a resistor placed across the triac anodes or the diodes, as shown in the several diagrams, further suppress voltage and current feedback, or transient voltages, so as to prevent damage to the triac.

Figure 1:
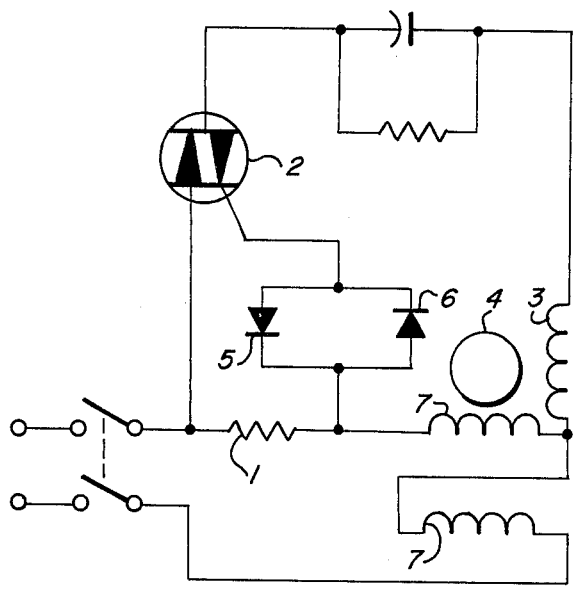
FIG. 1 is a schematic diagram illustrating the utilization of diodes disposed in back-to-back, parallel connection and in series in the gate circuit of a triac, the arrangement being especially adaptable to dual voltage, capacitor-start motors using a control resistor voltage drop device.

Attention is now directed to FIG. 1, in which it will be noted that a resistor 1 in series with a running winding 7 is used to control a triac 2 to operate the triac as a switch in the starting winding 3 circuit of a motor 4. Two diodes 5 and 6 are parallel connected back-to-back between the gate electrode of the triac 2 and one end of the running winding 7. During motor starting, the running winding 7 current is quite high since no back EMF is developed. This high current produces a corresponding voltage drop across the resistor 1 connected in series with the running winding 7. This voltage drop exceeds the forward threshold voltage drop across the two diodes 5 and 6 sufficiently to switch the triac 2 to the ON state, thereby energizing the starting winding 3 circuit. The motor 4 develops high starting torque to about 3/4 motor full load speed. As the back EMF increases, the motor running winding 7 current is reduced, and the voltage drop across the control resistor is correspondingly reduced until it falls near the forward threshold voltage drop of the diodes 5 and 6, whereupon the triac 2 is vertically cut off near motor full load speed. Typically, the components are matched such that the voltage drop across the control resistor 1 is reduced to on the order of 20 millivolts more than the normal forward voltage drop across the diodes 5 and 6. At this time, the diode 5, 6 forward voltage drop is below normal threshold forward voltage drop of the semiconductor diode PN junction. The triac 2 gate voltage is therefore on the order of 0.02 volts, and the current in the gate circuit is correspondingly reduced to microamperes to virtually eliminate leakage current to the starting winding 3.

Figure 2:
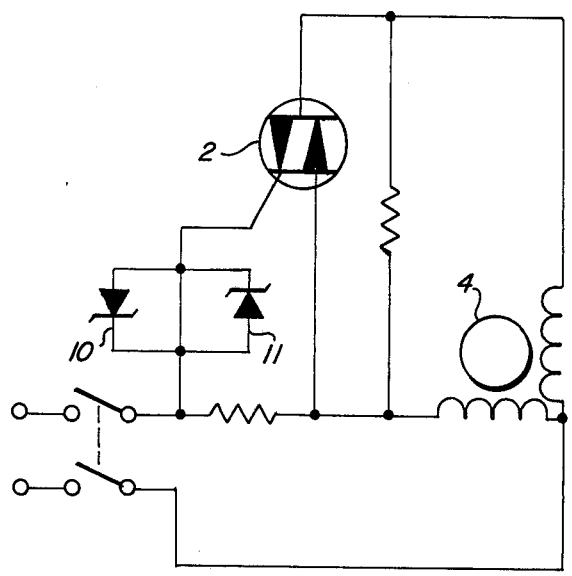
FIG. 2 is a schematic diagram of a split-phase motor circuit in which a control resistor is connected in series with both starting winding and running circuits, and two zener diodes, back-to-back parallel connected, are disposed in series in the gate circuit of the triac according to my invention.
Figure 4:
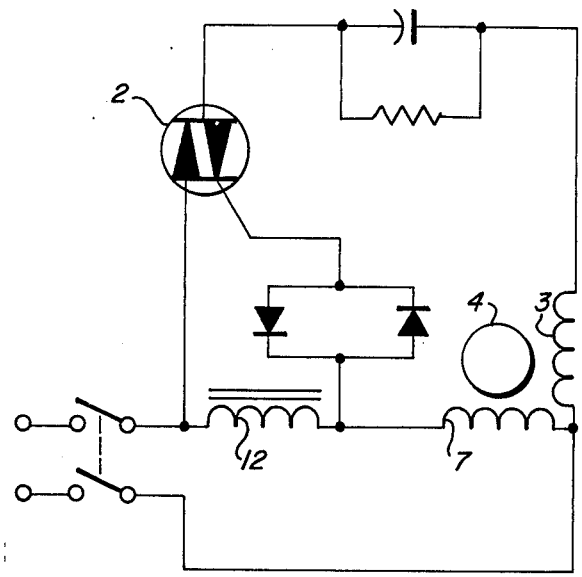
FIG. 4 is a schematic diagram of a capacitor-start motor circuit using a control inductor coil connected in series with the running winding of the motor and with a triac and a pair of diodes parallel connected back-to-back incorporating the principles of my invention.

In FIG. 2, zener diodes 10 and 11 are employed in place of the diodes 5 and 6 of the FIG. 1 configuration. In the FIG. 4 embodiment, the current sensitive means for developing the triac control voltage is inductor 12 rather than resistor 1. In FIG. 5, the current sensitive means comprises transformer 13. Additionally, the circuit including the resistor 14 and cathode-to-cathode connected zener diodes 15 affords additional protection to the triac 2 against transients and surges. In FIG. 6, triac pair 16 and 17 are further protected by the network including parallel back-to-back diodes 18 and 19 and resistor 20 connected across the outer electrodes of the triac pair.

Those skilled in the art will appreciate that my basic concept can be employed in various arrangements according to specific operating conditions; my invention is therefore not to be taken as strictly limited to the several exemplary embodiments presented.

I claim:

1. A control circuit for a single-phase electric motor of the split-phase or capacitor-start type including a main winding and a starting winding comprising:

power circuit means for connecting said main winding to a power supply;

starting circuit means for selectively connecting said starting winding to the power supply;

an a-c bidirectional semiconductor switch having first and second electrodes operatively connected in said starting circuit, and having a gate electrode for triggering the switch between a conduction state and a non-conduction state;

a current-sensitive control device connected in series with said main winding and said power circuit means; and bias-variable impedance means including two parallel-connected, oppositely-poled diodes connected between the gate electrode of said switch and said control device, said current-sensitive control device responsive to starting current flowing through said main winding to produce a forward voltage drop across said diodes above the forward conductive threshold voltage of the diode PN junction thereof sufficient to render said diodes conductive to trigger said switch into conduction and establishing a low-impedance for said bias-variable impedance means during the conduction state of said switch, said current-sensitive control device responsive to running current through said main winding to produce a voltage across said diodes below the forward conductive threshold voltage of the diode PN junction thereof insufficient to forward bias such diodes providing sharp cut-off thereof and thereby establishing a high impedance for said bias-variable impedance means and causing said switch to be triggered to its non-conduction state.

2. A control circuit according to claim 1 wherein said current-sensitive control device comprises an inductor coil connected in series with said main winding and said power circuit means, and said bias-variable impedance means is coupled between the gate electrode of said switch and one end of said inductor coil and the first electrode of said switch is coupled to the other end of said inductor coil.

3. A control circuit according to claim 1 wherein said current-sensitive control device comprises a transformer having primary and secondary windings, the primary winding of which is connected in series with said main winding and said power circuit means and the secondary winding of which is coupled between said bias-variable impedance means and the first electrode of said switch.

4. A control circuit according to claim 1 wherein said current sensitive control device comprises a resistor connected in series with said main winding and said gate electrode of said bidirectional semiconductor switch is coupled to one side of said resistor and the first electrode of said switch is coupled to the other side of said resistor.

5. A control circuit according to claim 1 wherein said diodes comprise two rectifier diodes whereby upon motor starting conditions said rectifier diodes conduct substantially at their forward voltage drop to gate said bidirectional conductive semiconductor switch into condition, and whereby at motor running conditions said rectifier diodes become non conducting to offer high impedance in said gate electrode circuit of said bidirectional switch to cause said switch to be biased to the off state.

6. A control circuit according to claim 1 wherein said diodes comprise two zener diodes whereby upon motor starting conditions, said zener diodes conduct substantially at their forward voltage drop region to gate said bidirectional semiconductor switch to the on state and at motor running conditions, said zener diodes become non-conducting to offer high impedance in said gate electrode circuit of said bidirectional switch to cause said switch to be biased to the off state.

7. A control circuit according to claim 1 and further including an impedance means connected across the bidirectional semiconductor switch first and second electrodes for suppressing the transient feedback voltage peaks and the dv/dt network upon motor starting and running conditions.

8. A control circuit according to claim 7, wherein said impedance means includes a bias resistor connection in series with two zener diodes coupled back-to-back across the first and second electrodes of said bidirectional semiconductor switch to supress the transient voltage feeback surge current and the dv/dt network upon motor starting and reversing condition.

9. A control circuit for a single-phase induction motor of the capacitor-start and capacitor-run type including a starting capacitor and running capacitor connected in parallel relation to each other and in series with starting winding circuit and running winding circuit angularly displaced in the stator core and inductively coupled to a rotor, comprising:

power circuit means for connecting said running winding circuit to a single-phase power supply;

sensing means coupled to said power circuit means for developing a control signal proportional to the load current to the running winding of the motor;

a starting circuit including a starting capacitor connected in series with said starting winding circuit and to the power supply;

a signal controlled bidirectional conductive semiconductor gate device having first and second electrodes connected in series in said starting circuit and having a gate electrode; and variable impedance means including two parallel-connected, oppositely-poled diodes connected in circuit between said gate electrode of said bidirectional gate device and said sensing means for closing said starting circuit in response to said control signal whenever the load current to the main winding exceeds a first threshold amplitude and adapted to open said starting circuit means whenever the motor load current falls below a second threshold amplitude.

10. A control circuit according to claim 9, further including a suppression circuit connected across the input and output electrodes of said bidirectional conductive semiconductor gate device and adapted to suppress transient voltage feedback and the dv/dt network upon motor starting and running conditions.

* * * * *